(12) United States Patent
Barnes et al.

(10) Patent No.: US 9,898,908 B2
(45) Date of Patent: Feb. 20, 2018

(54) METHOD AND SYSTEM FOR SITE-BASED POWER MANAGEMENT OF RADIO FREQUENCY IDENTIFICATION IMPLEMENTATIONS

(71) Applicant: TRAPEZE SOFTWARE ULC, Mississauga (CA)

(72) Inventors: Sharon Ann Irma Barnes, Kelowna (CA); Marty Charles Brooks, Kelowna (CA)

(73) Assignee: Trapeze Software ULC, Mississauga (CA)

( * ) Notice: Subject to any disclaimer, the term of this patent is extended or adjusted under 35 U.S.C. 154(b) by 78 days.

(21) Appl. No.: 14/095,744

(22) Filed: Dec. 3, 2013

(65) Prior Publication Data

US 2015/0154841 A1    Jun. 4, 2015

(51) Int. Cl.
| | |
|---|---|
| *G08B 13/24* | (2006.01) |
| *G01V 15/00* | (2006.01) |
| *G06Q 10/08* | (2012.01) |

(52) U.S. Cl.
CPC ......... *G08B 13/2428* (2013.01); *G01V 15/00* (2013.01); *G06Q 10/08* (2013.01)

(58) Field of Classification Search
CPC ...... G01V 15/00; G06Q 10/087; G06Q 10/08; G06K 2017/0051; G08B 13/2438
See application file for complete search history.

(56) References Cited

U.S. PATENT DOCUMENTS

| | | | |
|---|---|---|---|
| 6,538,563 B1 | 3/2003 | Heng | |
| 8,115,595 B2* | 2/2012 | Ryoo | G06K 7/0008 235/375 |
| 2005/0035849 A1* | 2/2005 | Yizhack | 340/5.92 |
| 2007/0109099 A1* | 5/2007 | Raphaeli | G01S 13/758 340/10.2 |
| 2012/0092134 A1* | 4/2012 | Stern | G01S 13/878 340/10.1 |
| 2012/0155349 A1* | 6/2012 | Bajic | H04W 4/008 370/311 |
| 2012/0203943 A1 | 8/2012 | Mutou | |
| 2013/0176111 A1* | 7/2013 | Ki | G06K 7/0008 340/10.1 |
| 2014/0061303 A1* | 3/2014 | Brandl | G06K 7/10059 235/385 |

* cited by examiner

*Primary Examiner* — Brian Zimmerman
*Assistant Examiner* — Sara Samson
(74) *Attorney, Agent, or Firm* — Elan IP Inc.

(57) ABSTRACT

A method and system for site based RFID power management is provided. The systems comprise one or more gateways, configured to create chatter in one or more gateway transmission ranges, a tag, located on an asset and operable in a plurality of states, configured to identify the presence of chatter in a tag reception range, and if chatter is identified by the tag, created by a chatter creating gateway that is one of the one or more gateways, then the tag enters a chatter present state.

14 Claims, 8 Drawing Sheets

METHOD AND SYSTEM FOR SITE-BASED POWER MANAGEMENT OF RADIO FREQUENCY IDENTIFICATION IMPLEMENTATIONS

FIELD OF THE INVENTION

The present invention relates generally to radio frequency identification location determination and power management. More particularly, the present invention relates to a method and system for determining whether or not an asset is on site, and what communication requirements relate thereto.

BACKGROUND OF THE INVENTION

The use of radio frequency identification (RFID) tags to assist with Asset management is known. Placing RFID tags on assets allows for tracking of an asset's location and status. For assets that may be in motion for large portions of time, it may be useful for the system to perform different operations based on whether the asset is in a site of interest or not. To be able to control the operations of the system based on this, the system must be able to determine if the asset it onsite or not.

One example of this sort of situation arises in the transit field. Transit officials often use asset management systems with RFID tags to track their vehicles. But often, operations that RFID tags are required to perform when the transit vehicle is within the transit bay are different from operations that are required to occur outside of the transit bay. By tracking this, transit officials may, for example, schedule maintenance activities and reduce power consumption.

There are existing methods that can be used to determine if an asset is onsite or not, but these methods can be prone to errors. It is therefore an object of the invention to provide a novel method and system for management of asset tracking systems based on the site they are located in.

SUMMARY OF THE INVENTION

There is a system for radio frequency identification (RFID) tag-based asset tracking comprising one or more gateways, configured to create chatter in one or more gateway transmission ranges, a tag, located on an asset and operable in a plurality of states, configured to identify the presence of chatter in a tag reception range, and if chatter is identified by the tag, created by a chatter creating gateway that is one of the one or more gateways, then the tag enters a chatter present state.

The one or more gateways may be located at a site and the chatter present state may comprises the tag performing onsite processes, further comprising the tag sending the asset's status information to the chatter creating gateway and the chatter creating gateway providing the status information to a central management system.

The identifying may comprise receiving one or more RFID communications, comparing each of the RFID communications to a list of chatter. The RFID communications may comprise one or more packets each having a packet header and wherein the list of chatter comprises a list of packet headers that are chatter.

The gateway transmission range of each of the one or more gateways and the tag reception range can be controlled.

The one or more gateways and the size of the transmission ranges may be configured to minimize the size and number of gap spaces at a site.

The one or more gateways may be located offsite and the chatter present state comprises the tag performing onsite processes, further comprising the chatter creating gateway requesting a status information of the tag, and the tag sending a message with its status information to the chatter creating gateway.

There is also a method for a tag in an asset management system, able to operate in a plurality of states, comprising listening for chatter, produced by one or more gateways that can produce chatter, within a tag reception range, if chatter is heard: checking the chatter to determine if it is chatter for the tag and if the chatter is chatter for the tag transmitting an acknowledgment signal to the chatter producing gateway; and entering a chatter present state.

There is also a method for operation of a gateway in an asset management system, configured to transmit chatter within a gateway transmission range, comprising transmitting chatter for a period of time, listening for an acknowledgment signal from a tag, if an acknowledgment signal is received from the tag, commencing communications with the tag.

The period of time may be defined to be larger than an asset tag offsite minimum.

The method may comprise requesting a status information from the tag, obtaining status information from the tag, and passing the status information to a central management server.

BRIEF DESCRIPTION OF THE DRAWINGS

Embodiments will now be described, by way of example only, with reference to the attached Figures, wherein.

DETAILED DESCRIPTION OF THE EMBODIMENTS

Figure 1:
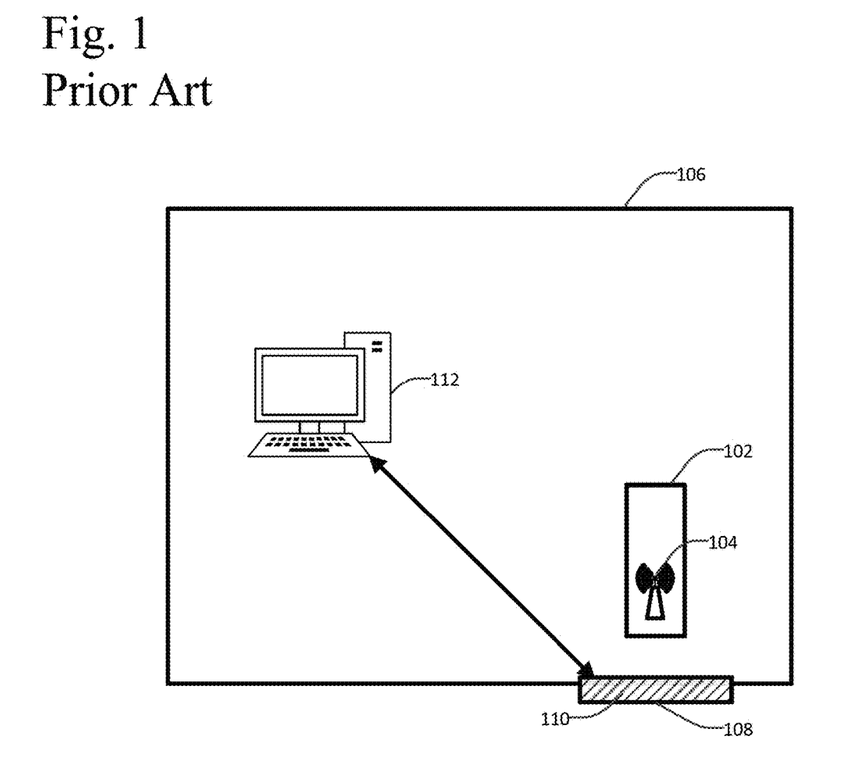
FIG. 1 shows a prior art system for a tag based asset management system used to determine if an asset is onsite.

FIG. 1 shows a prior art tag-based system to determine if an asset is onsite. Most prior art systems involve a location 106 that has one or more gates 108, each gate 108 has a chokepoint 110 that communicates with asset tag 104 via RFID asset tag 104. In operation, vehicle 102 drives into or out of gate 108 and tag 104 communicates with chokepoint 110 as this occurs, and vehicle 102 registers with chokepoint 110. Chokepoint 110 may then communicate the registration to PC 112. PC 112 may then use this information to determine whether vehicle 102 is onsite or offsite. For example, this may be done based on a last known state (onsite or offsite) for vehicle 102. Alternatively, multiple chokepoints 110 may be used at gate 108 such that the sequence of registration determines the state (ie registration with chokepoint A occurs before chokepoint B thus vehicle 102 is exiting, versus registering with B before A signifies that vehicle 102 is entering). Other methods include the use of motion detection sensors at chokepoint 110, which may detect when a vehicle 102 crosses it and use that information to determine whether or not vehicle 102 is onsite.

Prior art systems rely on the communication between chokepoint 110 and tag 104 to detect vehicle 102, which can fail due to any number of hardware, software or communication issues. For example, when vehicle 102 is crossing gate 108, chokepoint 110 may not read tag 104, causing the prior art system to lose track of vehicle 102 and present incorrect information on the vehicle's status. This system also does not inform the asset itself of whether or not it is at location 106, which may be useful if this information is to be used, for example, to reduce the power consumed by tag 104. The prior art system is also difficult to apply to sites without fixed entrances and exits, or areas that may not be entirely operated by the owners of the system.

Figure 2:
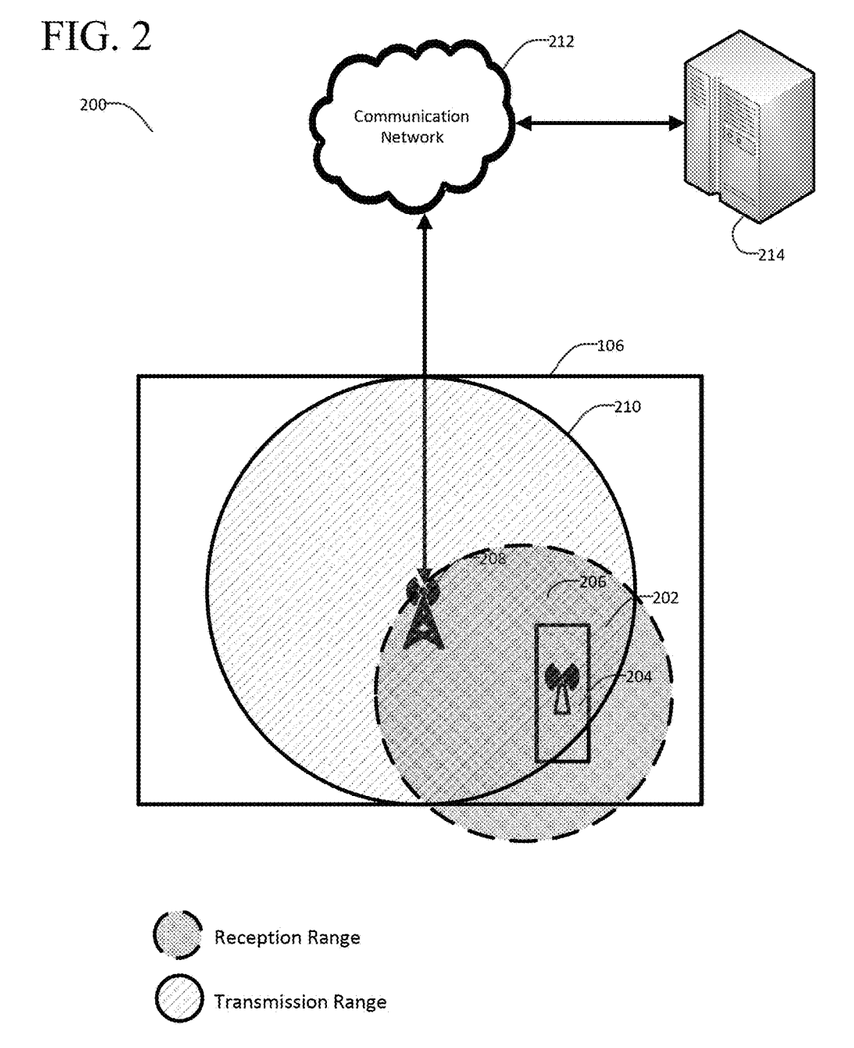
FIG. 2 shows a high-level architecture of a system for a tag based asset management system in accordance with an embodiment of the invention.

FIG. 2 shows a high-level architecture of system 200 for a tag based asset management system in accordance with an embodiment of the invention, comprising site 106, asset 202, asset tag 204, asset tag reception range 206, gateway 208, gateway transmission range 210, communication network 212 and central management system 214.

Site 106 may be a location at which users of system 200 would like to track assets 202 (such as the detailed and exaction location or placement of assets 202). Site 106 may be a location where assets 202 are stored, or may be another location of interest to system 200. Site 106 may be a physically bounded area, with only a limited number of entry/exit points. Alternatively, site 106 may not be physically bounded but only be a defined area of interest for system 200, for example defined by streets or geographic coordinates. In a transit application, for example, site 106 may be a transit bay where assets 202, potentially transit vehicles, go for maintenance and storage when they are not being used.

Asset 202 further comprises one or more asset tags 204, which may be located thereon or therein, and may be removably attached. The location of asset tag 204 on asset 202 may be used to optimize communication ranges and further reduce power consumption. Asset tag 204 may be able to retrieve and/or determine information relevant to asset 202 (status information), for example its location or information from other components (not shown) of asset 202, and transmit that information to other assets or gateway 208 when they are within range, allowing asset 202 to communicate with system 200 (for example providing status information to central management system 214) to provide the functionality described herein.

Asset tag 204 may further be able to store information regarding the status of asset 202, and use that information to modify its operations, for example based on its location and state, as described herein. Asset tag 204 may operate in various states, as described herein, such states for the purpose of the present application being considered either chatter present states (where the particular asset tag 204 is hearing chatter) or no chatter present states (where the particular asset tag 204 is not hearing chatter). Among the operations it may be able to modify, asset tag 204 may be able to adjust the distance within which it can transmit and receive information wirelessly, for example asset tag reception range 206. Asset tag 204 may also be able stop transmitting or receiving information, entering a 'sleep' state for periods of time when communication may not be required. Asset tag 204 may be powered by an onboard power source, such as battery 308, as described herein. Asset tag 204 may further comprise sensors, or be operably connected to sensors (not shown), that allow it to gather information regarding asset's 202 status.

Components that communicate wirelessly in system 200, for example asset tag 204 and gateway 208, have both a transmission range and a reception range. The transmission range denotes the distance which a component can transmit a signal to any other components within system 200, while the reception range of a component denotes the distance within which the component can hear signals. Components of system 200 are said to be in communicable range of each other when the reception range of a first component overlaps with the transmission range of a second, or the transmission range of the first component overlaps with the reception range of the second. When this is not true, the components are said to be out of communicable range of each other. If the reception ranges of both components overlap with the other component's transmission range, the components are said to be in bi-directional communicable range. Asset tag reception range 206 may be the distance within which asset tag 204 can receive signals from other components of system 200, including gateway 208. For example, asset tag 204 is said to be in communicable range of gateway 208 when asset tag reception range 206 overlaps with gateway transmission range 210 or if gateway's 208 reception range (not shown) overlaps with asset tag's 204 transmission range (not shown).

Asset tag reception range 206 may be initially configured on asset tag 204 and changed on demand by asset tag 204. By reducing the size of asset tag reception range 206, asset tag 204 may reduce the power it consumes, and by increasing the size of asset tag reception range 206, asset tag 204 may be able to communicate with other components of system 200 that are further away from it.

Figure 3:
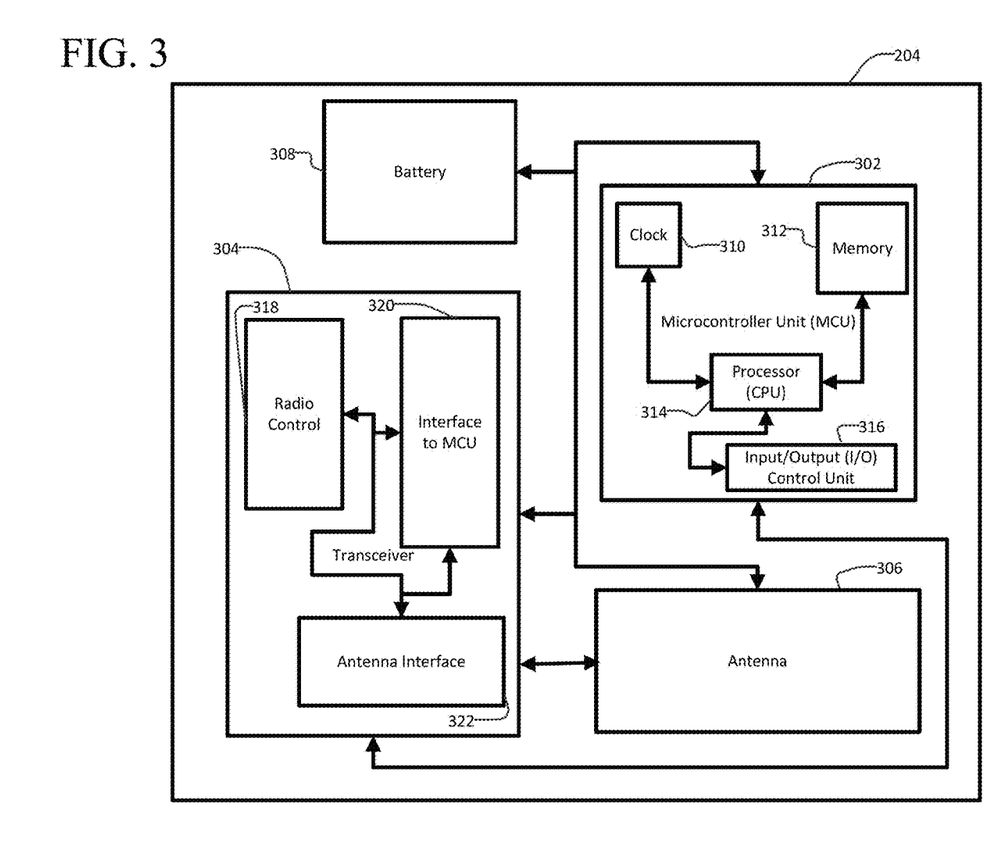
FIG. 3 shows a schematic of a tag according to an embodiment of the invention.

Gateway 208 may receive transmissions from one or more asset tags 204 and provide those transmissions to central management system 214 via communication network 212 (such as to perform operations, for example to determine the location or placement of assets 202 in site 106). Gateway 208 may be able to modify its transmissions to communicate chatter. As used herein, chatter is RFID transmissions or communications, produced by tags 204 or gateways 208 that may or may not convey information, but may be heard by other gateways 208 or tags 204. Chatter can be directed at a particular gateway 208 or tag 204, and for a particular gateway 208 or tag 204, while still being heard (and optionally acted upon) by other gateways 208 or tags 204. Chatter may indicate to the recipient that the recipient is near system 200, for example. Chatter may comprise a header or preamble, followed by the message or information, and may have additional wrappers (for example to facilitate transmission and reception). Chatter may simply comprise header/preamble information. For example, chatter may be a simple alternating 1-0-1-0-1-0 sequence being transmitted for a period of time (such as in a preamble) that may be followed by a message (where such message can be identified as a message/chatter of interest). Gateways 208 and tags 204 may define what they consider chatter and what chatter they will act upon. For example, they may specify what chatter preambles they will consider chatter, what preambles may be chatter and cause them to act, and what chatter they can ignore, or what packet types may be or are chatter, or may be acted on. Such configurations and lists (of chatter types, preambles, header information and the like) may be stored in MCU 302, for example in lookup tables in. These chatter concepts (including being able to define what is chatter, and what type it is, for each gateway 208 and tag 204, or groups thereof) may be useful as other components within system 200, for example asset tag 204, may require less power to listen for chatter as opposed to more detailed communications. This may be due to the limited power consumed by transceiver 304 to listen for a chatter signal, and other components of asset tag 204 not being powered as transceiver 304 performs the listening operation. Gateway 208 may also transmit an identifier (such as in a header or preamble), which may identify for other components of system 200 that gateway 208 also belongs to system 200. The identifier may be unique to gateway 208, system 200, or not be unique. The identifier may also be used to communicate to other components which specific gateway 208 they are communicating with, in which case the identifier may not be common across system 200 but uniquely identify each gateway 208 within system 200.

Gateway 208 may communicate with a plurality of asset tags 204 essentially or effectively simultaneously by communicating with a first asset tag 204 for a period of time, then switching to a second asset tag 204, and then a third etc. before returning to the first asset tag 204 to continue communicating with it. This switching may occur fast enough that to a user the asset tags 204 and gateway 208 seem to be in constant communication with each other. Other methods to communicate with a plurality of asset tags 204 known by those skilled in the art may be used. Gateway 208 may be powered, for example, externally, through a direct connection to the municipal electricity grid, or using an onboard power source. Gateway 208 may be removably attachable to substantially any surface and may operate in both external and internal environments. Gateways 208 may be located at substantially any location where assets 202 needs to communicate. Though the figure shows gateway 208 located within site 106, gateway 208 may operate in both internal and external environments.

Gateway transmission range 210 represents the distance within which gateway 208 may be able transmit communication signals to other components of system 200. As described herein, gateway transmission range 210 may overlap with asset tag reception range 206 to allow gateway 208 to communicate with asset tag 204. The size of gateway transmission range 210, or a combination of ranges from one or more gateway 208, may be configured to ensure it covers a certain area, site 106 for example.

Communication network 212 enables communication of information between various components of system 200 including, but not limited to, gateway 208 and central management system 214. Communication network 212 allows for a plurality of signals or information to be sent through its network simultaneously. Communication network 212 may be any public or private network, wired or wireless, and may be substantially comprised of one or more networks that may be able to communicate with each other. Communication network 212 may use a variety of mediums, such as cellular and WiFi networks. Communication networks 212 may not be required, for example, if components of system 200, such as gateway 208 and central management system 214 are able to communicate directly.

Central management system 214 may be a component of system 200 that provides functionality for users relating to one or more assets 202, such as to operate one or more transit services for a fleet of assets 202. Such functionality may include tracking the location of an asset 202, diagnosing any issues with asset 202 that may require servicing, and scheduling any service work that may be required for asset 202. Central management system 214 may compile information from one or more gateways 208 via communication network 212 with other information, such as servicing work schedules and parts delivery times, for use in providing functionality of system 200 and central management server 214. Central management system 214 may also perform analysis on this information to help in determining the overall performance of a fleet of assets 202, either in real-time or aggregated over configurable periods of time. Central management system 214 may be implemented via one or more pieces of software and may be operated by one or more users. Though it is shown in the figure as one computer, it can be composed of one or more computing and data storage devices and its functionality can be split up across these devices as appropriate. Of course central management system 214 may provide non-transit related functionality, depending on what assets 202 are involved. Central management system 214 is shown as remote from site 106, but may be located anywhere, including within site 106.

FIG. 3 shows a schematic of asset tag 204 according to an embodiment of the invention. Asset tag 204 may be comprised of microcontroller unit (MCU) 302, transceiver 304 and antenna 306, any or all of which may be operably connected, for example to allow any required communication there between. Asset tag 202 further comprises battery 308, which may be operably connected to the other components in asset tag 202 to act as a power source for these other components.

MCU 302 may control operation of asset tag 204, determining when asset tag 204 should perform specific operations, such as communication, and directing the operations of transceiver 304 and, via transceiver 304, antenna 306. MCU 302 may be able to adjust the operations of asset tag 204 based on the information it receives from other components, including transceiver 304. MCU 202 may have a configurable cycle (that may be timed by clock 310) where it 'powers on' briefly to determine whether it, and/or other components of asset tag 204, require power to perform operations. For example, MCU 302, at the end of a clock cycle, may query transceiver 304 if there is chatter from a gateway 208 within reception range 206. If there is chatter and it is from a gateway 208 that is part of system 200, then other parts of asset tag 202 may be powered on to allow them to perform operations as required. Alternatively if there is no chatter, or if the chatter is not from a gateway 208, then no other parts of asset tag 204 may be powered on, and MCU 302 may itself return be able to 'power off' to conserve significant battery life.

MCU 302 may communicate directly with transceiver 304, sending it operation instructions and responding to the information it receives from it. For example, once 'powered on', MCU 302 may provide or direct power to transceiver 304 and then query it to determine if it is receiving chatter signals, then provide more power as required to enable transceiver 304 to perform required communication operations. MCU 302 may also communicate with systems outside of asset tag 204, for example other computer systems on asset 102 (such as via I/O control unit 316), and use that information to determine what operations asset tag 202 should perform.

MCU 302 further comprises clock 310, memory 312, central processing unit (CPU) 314 and input/output ("I/O")

control unit 316, and may comprise or house transceiver 304, antenna 306 and/or battery 208 depending on hardware implementation details.

Transceiver 304 allows asset tag 204 to communicate with system 200. Transceiver 304 may communicate substantially any of the information asset tag 204 has, collects or calculates, including, for example the location of asset tag 204. Transceiver 304 may generate and receive signals wirelessly. Transceiver 304 may be able to convert signals that it receives wirelessly into a medium used to transmit information to MCU 302. Transceiver 304 may also receive information from MCU 302 that may control what signals transceiver 304 transmits, when it will transmit signals, and when it will listen for signals to receive. Alternatively or in addition, transceiver 304 may be able to initiate these actions on its own.

Transceiver 304 may be a low power transceiver, such as the CC1101 produced by Texas Instruments, and may be able to enter different states to minimize power usage. For example, when not in operation, transceiver 304 may enter into sleep mode, and when listening for chatter, transceiver 304 may limit the power used to provide only enough to detect if there is chatter, and provide more power as required if chatter is found.

Transceiver 304 further comprises radio control 318, MCU interface 320, clock 322 and antenna interface 322, and may comprise antenna 306 depending on hardware implementation details.

Though transceiver 304 may be able to transmit and receive signals itself, it may be operably connect to antenna 306, which may perform one or both of these functions instead. Antenna 306 may be able to increase the ranges across which asset tag 202 can transmit and/or receive messages, including asset tag reception range 206, and do so without consuming as much power as transceiver 304 may require to achieve the same range. When used for receiving messages, antenna 306's range may define the size of asset tag reception range 206. Transceiver 304 may direct power from battery 308 to antenna 306, or may send a signal to antenna 306 that will allow it to 'power up' and perform operations. Antenna 306 may also be able to minimize power consumption by entering a 'sleep state'. Antenna 306 may be external to transceiver 304, and may be external to asset tag 204.

Battery 308 may store power for use by some or all of the components located on asset tag 204. It may power these components directly, or may be routed through MCU 302 to the other components, with MCU 302 directing when transceiver 304 and antenna 306 receive power. It may be a light, small battery whose usage may be minimized to last for long periods of times. It may be charged by an external source. Exemplary batteries 308 may include include rechargeable lithium batteries (such as lithium/ion or lithium/metal), nickel, metal hydride, super-capacitors, and the like.

Clock 310 may track time and provide a stable clock signal which may be used by CPU 314, and/or other components of MCU 302, to perform operations. The clock also may be directly connected to other components within asset tag 204. This clock may be based on a crystal oscillator, or use another technology as would be known to those of skill in the art. Clock 310 may have one or more configurable timers, one of which may be a trigger for asset tag 204 to wake up when it expires. Clocks similar to clock 310 may also exist independently in other components, for example in transceiver 304 and antenna 306. Other timers may exist during operation as well, causing tag 204 (and/or components thereof) to perform certain activities on expiry. Such other timers may have different times or frequencies depending on, for example, whether asset tag 204 is on site or not, in motion or not, which state MCU 202 or tag 104 is in, or other factors.

Memory 312 may allow information to be stored in asset tag 204. It may store or collect information from within MCU 302, or be sent information from other sources and store that information for later use by asset tag 204. This information can comprise programmed instructions as well as information collected by other components, such as transceiver 304, and that may be used by other components, such as CPU 314. For example, memory 312 may store information that indicates whether asset 202 is onsite or offsite. Memory 312 may also store information relating to the identifier that asset tag 204 expects to receive from gateway 208. Memory 312 may comprise volatile memory such as random access memory, non-volatile memory such as varieties of read only memory, or a combination of both.

CPU 314 may control at least some of the operations of asset tag 204 by performing logical calculations using information it receives from the other components and instructions that may be stored in memory 312. CPU 314 may also determine what operations should be performed by asset tag 204 based on parameters sent to it by other components, whether it is currently onsite or offsite. It may determine what information should be stored in memory 312, and if information should be sent to components outside of MCU 302 using I/O control unit 316 and/or transceiver 304. CPU 314 may also determine what operations other components, inside and outside of MCU 302, should be performing, and if they should be 'powered off' to conserve power.

I/O control unit 316 may send information to components outside of MCU 302, and receive information from outside components to be processed by MCU 302, which may include transceiver 304. These outside components may be internal or external to asset tag 202. If the outside components are external to asset tag 204, the information may be sent wirelessly to the outside components from I/O control unit 316 via transceiver 304 and antenna 306. I/O control unit 316 is in direct communication with CPU 314, which informs it as to what information to send, and receives information that I/O control unit 316 collects. CPU 314 can use this information as an input into its logical calculations.

Radio control 318 may control what mode transceiver 304 is in. These modes may comprise:

Transmit mode: In this mode transceiver 304 may be transmitting messages wirelessly, potentially through antenna 306 via antenna interface 322

Receive mode: In this mode transceiver 304 may receive information, such as through antenna 306 via antenna interface 322, and convey those messages to MCU 302 via MCU interface 320

Sleep mode: In this mode transceiver 304 has powered down most of its components and is only using power as necessary to ensure that it can 'awaken' out of sleep mode when necessary.

Radio control 318 may be controlled by signals received from MCU interface 320, through a direct connection to MCU 302, or it may a have processor among its components that can perform logical operations based on data it receives in a manner similar to CPU 314.

MCU interface 320 may send signals to and receives signals from MCU 302. It may also send and receive information from other components of asset tag 204 or asset 202. MCU interface 320 may interpret the information it receives from these other components and pass it along to components within transceiver 304 as necessary. For example, information to be transmitted via antenna 306 may be sent directly to antenna interface 322, while information that controls the mode of transceiver 304 may be sent directly to radio control 318.

Antenna interface 322 may allow transceiver 304 to be operably connected to an external antenna, such as antenna 306. Antenna interface 322 relays information it receives from MCU interface 320 to antenna 306 for transmission, and sends any information it receives from antenna 306 to MCU interface 320. Antenna interface 322 may be set to be either transmitting or receiving signals based on the mode set by radio control 318. Antenna interface 322 may also be configured to power antenna 306.

Figure 4:
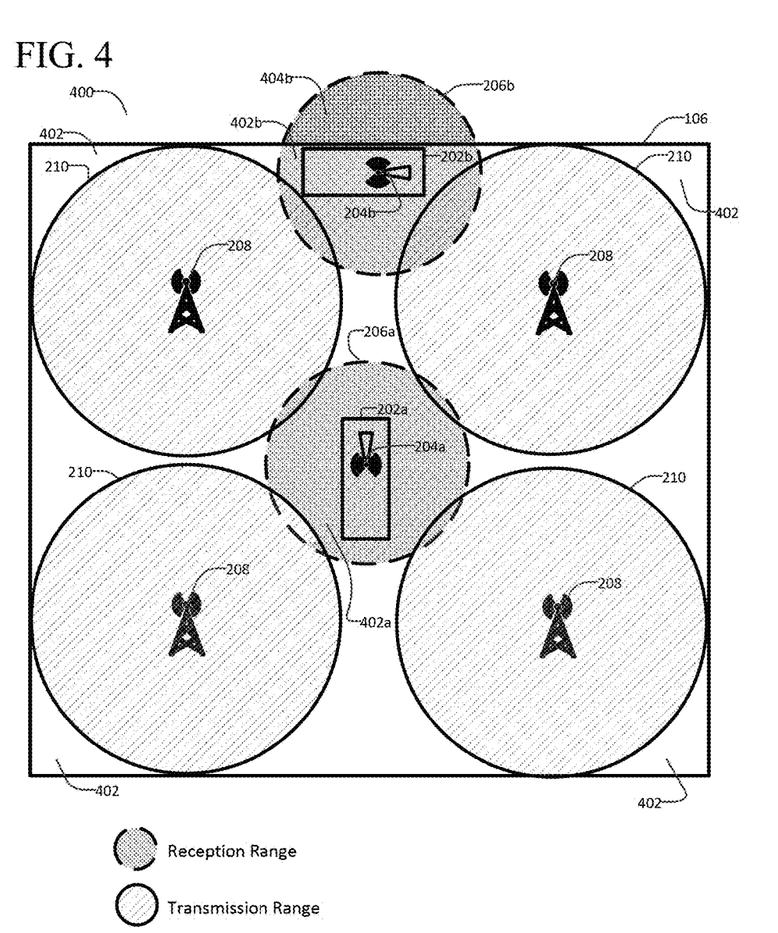
FIG. 4 shows a further architecture of a system for a tag based asset management system.

FIG. 4 shows a further architecture of system 400 for a tag based asset management system.

System 400 may be an implementation of system 200 for a specific site 106. System 400 configures gateways 208 in site 106 to ensure anytime asset 202 is on site 106, it is within communicable range of a gateway 208. As mentioned herein, gateways 208 may have a configurable gateway transmission range 210. Asset tag 204 also may have a configurable asset tag reception range 206. These ranges may be configured to optimize both space coverage and power consumption. In one embodiment reception ranges are set to be quite large and reception ranges set to be smaller. This largely ensures that when a gateway 208 is transmitting it is being heard by any object near it (and any object it thinks can hear it as those within its transmission range would have a reception range that exceeds the transmission range).

Site 106 may contain a plurality of gateways 208 to ensure that gateway transmission ranges 210 cover substantially or effectively all of site 106 in which assets 202 may be located, possibly in conjunction with the asset tag reception range 206. Areas in site 106 that are not covered by a gateway transmission range 110 (and where asset tag reception range 206 does not overlap with at least one gateway 208) are referred to as gap spaces 402. There may also be reception gap spaces (not shown), which are areas of site 106 that are not covered by the reception range of gateway 208. These reception gap spaces may be substantially similar to gap spaces 402, but may be located in different areas and may be different sizes than gap spaces 402. Gap spaces 402 may tend to occur most frequently near the boundaries of site 106 (where boundaries may comprise exterior walls, fences, or may be a property line with no physical embodiment). By increasing the number of gateways 208, the size and/or number of the gap spaces 402 may be reduced, as more gateways 208 may lead to gateways 208 be placed closer to the boundaries of site 106. The size of gap spaces 402 may also be reduced by increasing the size of gateway transmission ranges 210. Reducing the size of gap spaces 402 may be advantageous as the size of asset tag reception range 206 can be reduced, at least while at site 106, to be just large enough to ensure that asset tag 204 remains in communicable range of a gateway 208 when it is located in the largest gap space 402 in site 106. Reducing the size of gap spaces 402 reduces the size required for asset tag reception range 204, which may reduce the amount of power consumed by asset tag 202. For example, asset 202a, and asset tag 204a, may be located in a gap space between the four gateways 208 in site 106. Asset tag 202a may maintain an asset tag reception range 206a that is just large enough to ensure that it remains in communicable range of at least one gateway 208 when it is in gap space 402a, effectively establishing the optimal size for asset tag reception range 206a. Asset tag 204b may also be located in a gap space 402, which may be smaller in size than gap space 402a. Despite this, the size of asset tag reception range 206b may be the same as asset tag reception range 206a, to ensure that, if asset tag 204b moves into the largest gap space 402 in site 106, gap space 402a, it will remain in communicable range. This ensures that, while on site 106, asset tag 204 always remains in communicable range of a gateway 208. Alternatively, the size of asset tag reception range 206b may be different from asset tag reception range 206a, and may change as asset 202b moves to different parts of site 106 with different sized gap spaces 402, as described herein.

The largest gap space in site 106 may be stored in system 200, and may be communicated from central management system 214 to gateway 208, which may then be transmitted to asset tag 204. Asset tag 204 may use this largest gap space information to adjust its asset tag transmission range 206 so that it maintains the optimal size while on site 106.

Asset tag 204 may also be able to dynamically change the size of asset tag reception range 206 as it moves around site 106, automatically adjusting it to remain in communication with gateway 208. This may be done, for example, if gateway 208 is placed near the location where asset 202 is stored while not in use, so that asset tag reception range 206 may be reduced to a minimal size given the proximity of gateway 208 and the size of the gateway transmission range 210. Asset tag 204 may also dynamically change the size of asset tag reception range 206 to adjust to nearby walls and obstacles that may impede its range. For example, asset tag reception range 206b may be impeded by the wall of site 106. This may cause some or all of reception range portion 404b to be shielded, reducing its size. Walls and obstacles may similarly impede gateway reception range 210. If the wall is an internal wall to site 106, and the internal wall is between asset tag 204 and gateway 208, asset tag 204 may need to consume more power to ensure that it remains in communicable range of gateway 208 (and/or further gateways 208 may need to be added, shield reduction may need to occur, or asset 202 may need to be moved). Internal walls could also be used as shields to prevent certain gateways 208 from communicating with asset tags 204 on the other side of the internal wall.

Figure 5:
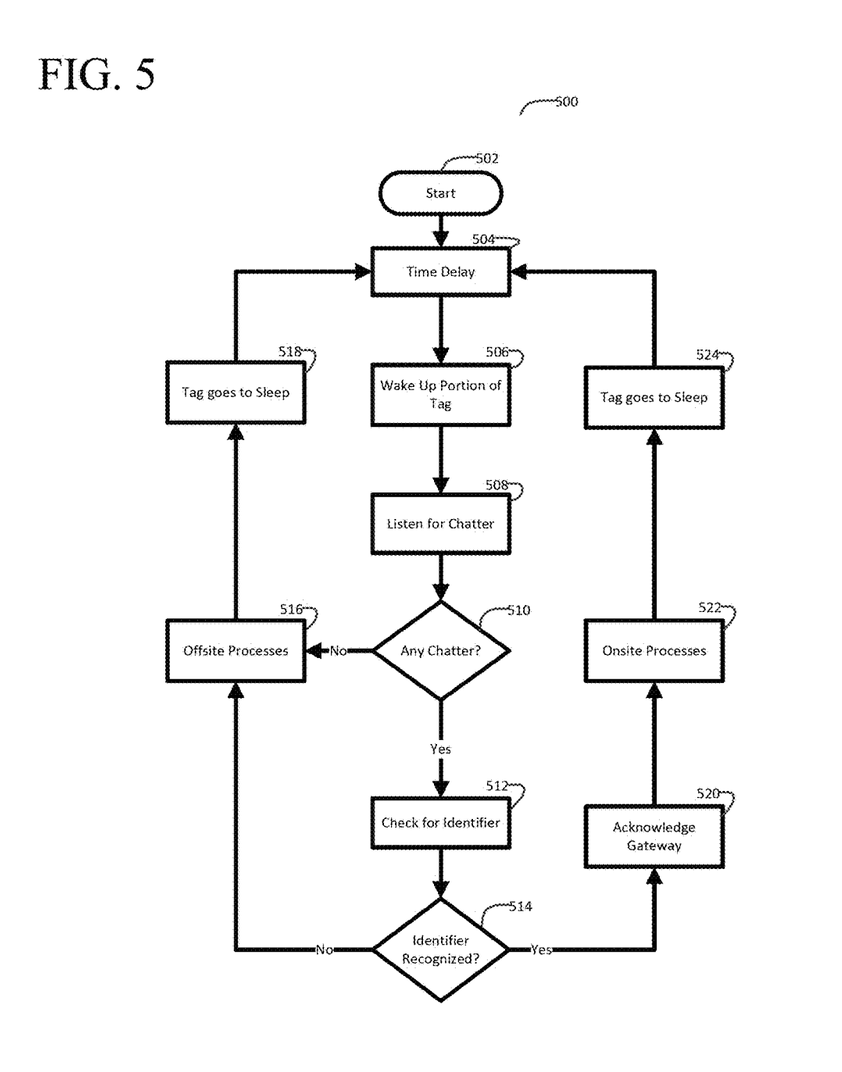
FIG. 5 is a flow chart of a method for operation of a tag on an asset to determine if the asset is onsite according to an embodiment of the invention.

FIG. 5 is a flow chart of method 500 for operation of asset tag 204 on asset 202 to determine if asset 202 is onsite according to an embodiment of the invention.

Method 500 allows asset tag 204 to determine if it is onsite using communications with gateway 208.

Method 500 begins at 502, where asset tag 204 may be considered to be in a 'sleep' state, and not active or performing other operations. This may occur, for example, when asset tag 204 is out of communicable range of any other components of system 200, or when it has completed its processes and no transmission operations need to occur for a period of time. At 504 asset tag 204 waits for a configurable period of time before exiting sleep state. The configurable period of time may, for example, be implemented by clock 310. All other components of asset tag 204 that are not required are, or remain, powered down, and radio control 318 may set transceiver 304 to be in 'sleep' mode.

When the configured amount of time has elapsed, asset tag 204 proceeds to 506 and 'awakens' a portion of the tag, for example providing power to that portion. The portion that is 'powered on' is determined based on which components of asset tag 204 are required for asset tag 204 to listen for chatter from gateway 208 at 508. This may comprise providing power from battery 308 to MCU 302 and transceiver 304, through control by CPU 314.

Method 500 then continues at 508 to listen for chatter. This may involve CPU 314 sending a "listen signal" to transceiver 304 via I/O control unit 316 and MCU interface 320 that would direct it to listen for chatter. This signal may be passed on to radio control 318, which may set transceiver 304 into a receiving mode, and instruct antenna interface 322 to receive signals from antenna 306. Although several components may be required to perform the listening operation, other components of asset tag 204 may not be provided power; asset tag 204 may be designed such that chatter can be detected with a few low power components. For example, MCU interface 320 may direct the listen signal directly to antenna interface 322, as opposed to routing it through radio control 318, to reduce the number of components that need to be powered for the listening operation. As a further embodiment, transceiver 304 may have a clock among its components, and initiate antenna interface 322 directly without using MCU 302. If chatter is detected, a signal may be sent from transceiver 304 to MCU 302 that informs CPU 314 of that fact, which in turn may be stored in memory 312 for future reference. Of course in such an embodiment transceiver 304 would need to be able to "awaken" MCU 302 in order to perform other activities if such is determined to be required by whatever transceiver ascertains from antenna 306 and may determine therefrom.

At 510 method 500 continues to 512 (which may be a chatter present state) if chatter is detected and to 516 (which may be a no chatter present state) if no chatter is detected.

At 512 asset tag 204 may check for an identifier that may be sent by one or more gateways 208 producing chatter (a chatter creating gateway) or tags 202 (a chatter creating tag). This may involve MCU 302 transmitting a signal to transceiver 304 that instructs it to continue listening for a recognizable identifier/header/preamble. To reduce power consumption, for example, MCU 302 may not need to send a signal as transceiver 304 may automatically listen for an identifier if it detects chatter. Once an identifier is received by transceiver 304, it may be sent to MCU 302 and stored in memory 312. CPU 314 may then compare the identifier received to the identifier(s) stored in memory 312 which may contain all identifiers used in system 200, to determine if there is a match. As identifiers may be used to uniquely identify gateways 208, when gateways 208 are added to system 200 the list of identifiers stored in memory 312 may need to be updated from central management system 214. This update process may occur during onsite communications. Identifiers may also be used to designate a subset of gateways 208 within system 200 for asset tag 204 to communicate with, as opposed to allowing asset tag 204 to communicate with all gateways 208 in system 200. This may require that only the identifiers relating to the subset of gateways 208 that asset tag 204 may communicate with are stored in memory 312.

At 514 method 500 continues to 516 if no match is found and to 520 if a matching identifier is found.

At 520, asset tag 204 is in communicable range of gateway 208, and therefore asset 202 is onsite or proximate to at least one chatter producing gateway or tag. MCU 302 may send a signal to transceiver 304 that instructs it to send an acknowledgment transmission to gateway 208 or tag. In one embodiment tag 204 may acknowledge ("ACK") gateway 208 (as asset 202 may be onsite) and may not ACK another asset 202 (or may not even hear chatter from another asset 202—as described herein).

Asset tag 204 may then acknowledge itself to gateway 208. At 522, asset tag 204 begins performing onsite processes. These may include sending information regarding asset's 202 status, for example location information or maintenance diagnostics, or information collected by asset 202 while it was offsite, to gateway 208 so that it may be compiled by central management system 214 and analyzed for users of system 200. At 524 asset tag 204 has completed the onsite processes and may return to a 'sleep' state to conserve power. Method 500 then returns to 504 to await the completion of the time delay.

Conversely, at 516, asset tag 204 is not in communicable range of gateway 208 or has not received a recognizable identifier, and therefore asset 202 may be considered offsite. This will trigger asset tag 204 to enter offsite processes. These processes may not involve many communications, and as such may require less power than onsite processes. Once these processes are complete, asset tag 208 returns to the 'sleep' state at 518 and then returns to 504 to await the completion of the time delay.

In a further aspect of method 500, a magnetic field may be part of the chatter—"awakening" asset tag 204 when the magnetic field, but then listening for RFID chatter as described herein to determine whether to stay awake and what actions to take.

Figure 6:
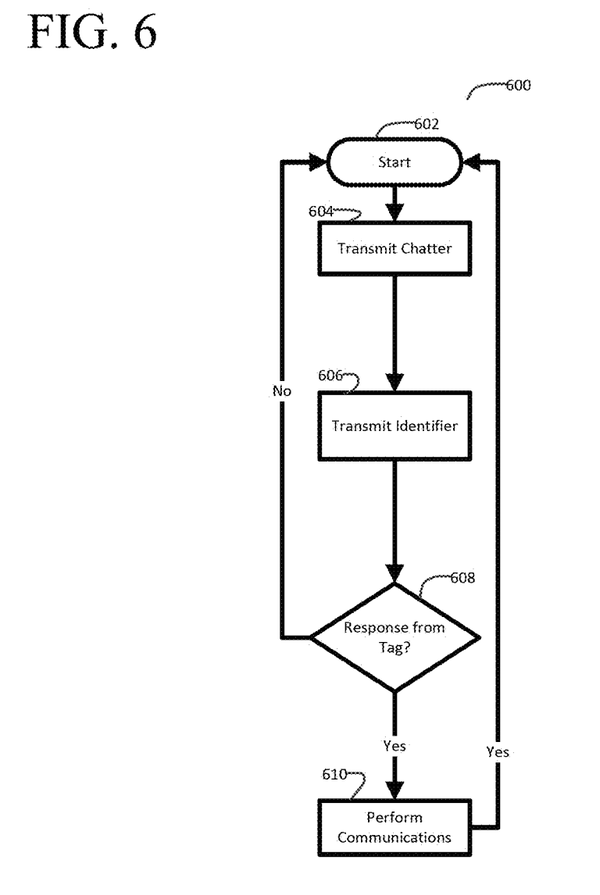
FIG. 6 is a flow chart of a method for operation of a gateway according to an embodiment of the invention.

FIG. 6 is a flow chart of method 600 for operation of gateway 208 according to an embodiment of the invention.

Method 600, performed by one or more gateways 208 alone or in combinations, allows system 200 to determine if asset 202 is onsite. Method 600 determines if an asset tag 204 is within communicable distance to gateway 208 by transmitting chatter and an identifier, before initiating onsite communications. As gateway 208 may be communicating with multiple asset tags 204 at the same time, it may be at different locations within method 600 when communicating with different tags. For example, gateway 208 may be sending an identifier to a first asset tag 204, while simultaneously performing onsite communications with a second asset tag 204.

Method 600 begins at 602, where gateway 200 may be largely idle. Method 600 continues to 604 where chatter is created and/or transmitted. Gateway 208 transmits this chatter signal for a pre-defined amount of time, determined as described herein, before sending out an identifier at 606. It then switches to a receive mode to listen for any acknowledgement signals from asset tags 204 that may be in communicable range. After waiting a configurable amount of time for a response, at 608 if gateway 208 has not received a response from an asset tag 204, method 600 returns to 602 where gateway 208 may return to being largely idle.

If at 608 a response, such as an acknowledgement message, is received from an asset tag 204, method 600 proceeds to 610 and gateway 208 begins communications with asset tag 204. The content of these communications may change based on the location of gateway 208 and asset tag 204. For example, if gateway 208 is located within site 106, it may request to receive information from asset tag 204 regarding the maintenance requirements of asset 202, and details that may have been collected while asset 202 was away from site 106. Conversely, if gateway 208 is located away from site 106 (which may make it substantially similar to gateway 802, as described herein), gateway 208 may signal asset tag 204 to transmit information identifying asset 202, allowing gateway 208 to transmit asset 202's current location to central management system 214. Gateway 208 may also signal asset tag 204 to enter a 'sleep' state when communications have completed to conserve power. Once communications with asset tag 204 are complete, method 600 returns to 602 and gateway 208 may return to being largely idle.

Figure 7:
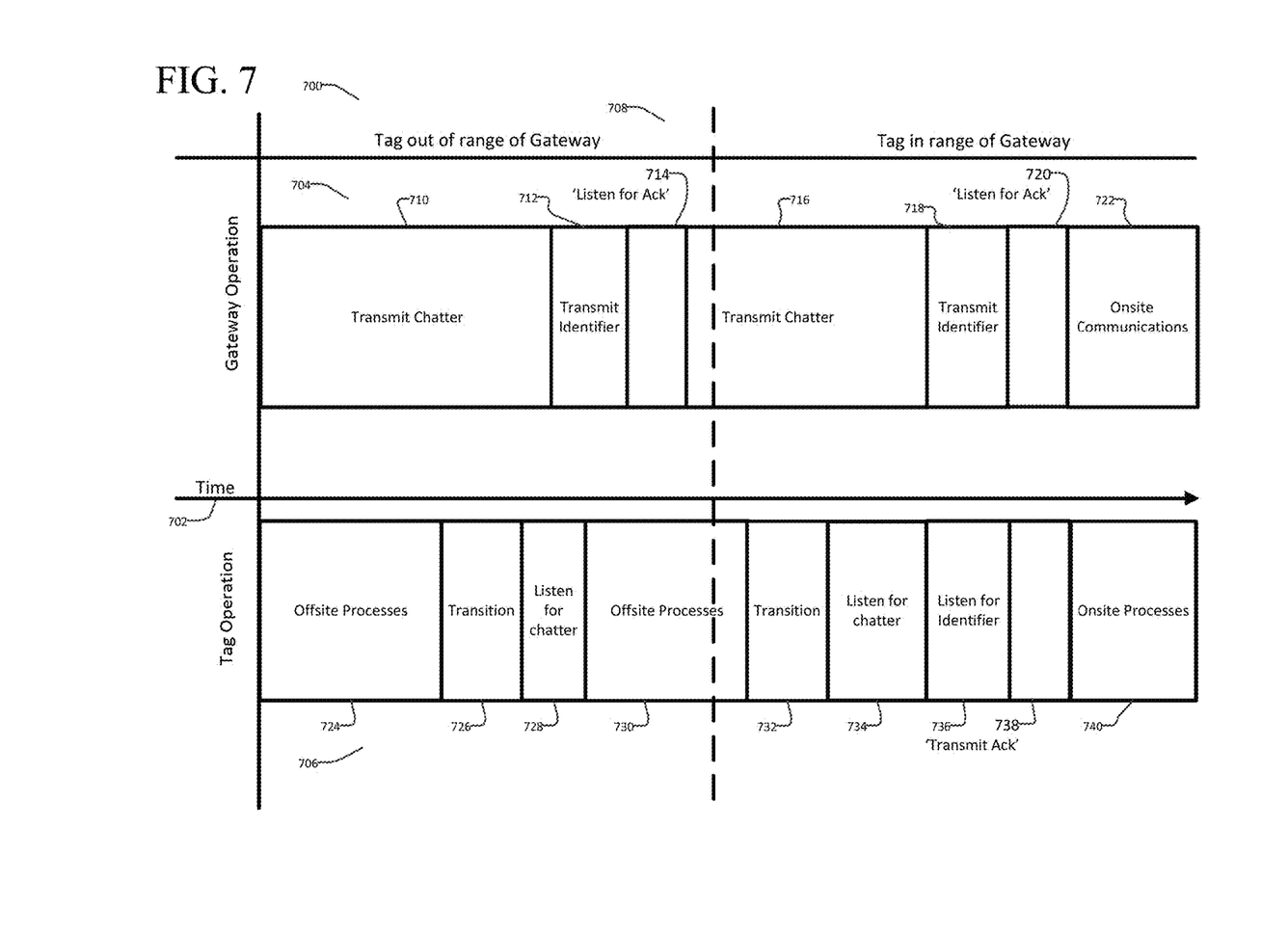
FIG. 7 shows a diagram that illustrates how the tag and the gateway communicate with each other.

FIG. 7 shows a diagram that illustrates how asset tag 204 and gateway 208 communicate with each other. Specifically, diagram 700 shows how methods 500 and 600 described herein may be coordinated to ensure that, when asset tag 204 and gateway 208 are in communicable range of each other, a communication link is formed that allows them to transmit information to each other.

Horizontal axis 702 in diagram 700 indicates the progression of time. This axis also vertically divides top portion 704, which displays the operations performed by gateway 208, and bottom portion 706, which displays the operations performed by asset tag 204. Dashed vertical line 708 signifies the point in time when asset tag 204 goes within communicable range of gateway 208.

At 710 gateway 208 is transmitting chatter for a period of time. This period of time is configured to be longer than the period of time that asset tag 204 may spend performing offsite processes 720 and transition 722, an amount of time that can be calculated as described herein. After transmitting chatter for the configured period of time, gateway 208 transmits an identifier at 712 and proceeds to listen for an acknowledgment from asset tag 206 at 714. If it does not receive an acknowledgement, it returns to transmitting chatter.

Simultaneously at 724, asset tag 204 is performing its offsite processes. This may consist of a variety of simple transmissions and calculations, depending on the application for which system 200 is being used. For example, offsite processes may include storing data collected by asset 202 while it is offsite. Once offsite processes are complete, at 726 asset tag 204 enters a transition stage that includes a period of time where asset tag 204 is in a 'sleep' state and is using very little power, as described in method 500. At a minimum, the time required for asset tag to go through both 724 and 726 would be the amount of time required to perform any mandatory offsite processes in addition to the time required to complete the transition process. This minimum time will be referred to as the asset tag offsite minimum.

Asset tag 204 then proceeds to 728, where it listens for chatter from gateway 208. As the amount of time that gateway 208 is transmitting chatter may be configured to be larger than the asset tag offsite minimum, if asset tag is not performing any more than the mandatory minimum for offsite processes, it may be able to hear chatter from a gateway 208 that is in communicable range.

At 728 asset tag 204 listens for chatter but cannot hear it as it is out of communicable range of gateway 208. It therefore returns to its offsite processes in 730. Similarly, at 716, as gateway 208 has not received an acknowledgment note from asset tag 204, it returns to its chatter transmission.

While asset tag 204 is performing offsite processes 730 and gateway 208 is transmitting chatter 716, asset tag 204 and gateway 208 come into communicable range of each other. Asset tag 204 then proceeds to transition 732, and then proceeds to listen for chatter at 734. At this point, asset tag 204 may detect the chatter being transmitted from gateway 208, and continue to listen for an identifier at 736. Gateway 208 will proceed to transmit an identifier at 718, and asset tag 204 may receive this identifier and determine if it is relevant. Once confirmed, asset tag 204 may transmit an acknowledgement message at 738 (noting that all ACKs herein are optional), which gateway 208 will receive at 720, triggering gateway 208 to commence onsite communications 722, where it builds a communication link with asset tag 204 and begins transmitting information. After sending the acknowledgment message, asset tag 204 also begins its onsite processes at 740, and begins communicating with gateway 208 as necessary to complete its functions while onsite. Note that onsite processes 740 may be different if communications are occurring with a gateway 802 (described herein) as opposed to a gateway 206.

Figure 8:
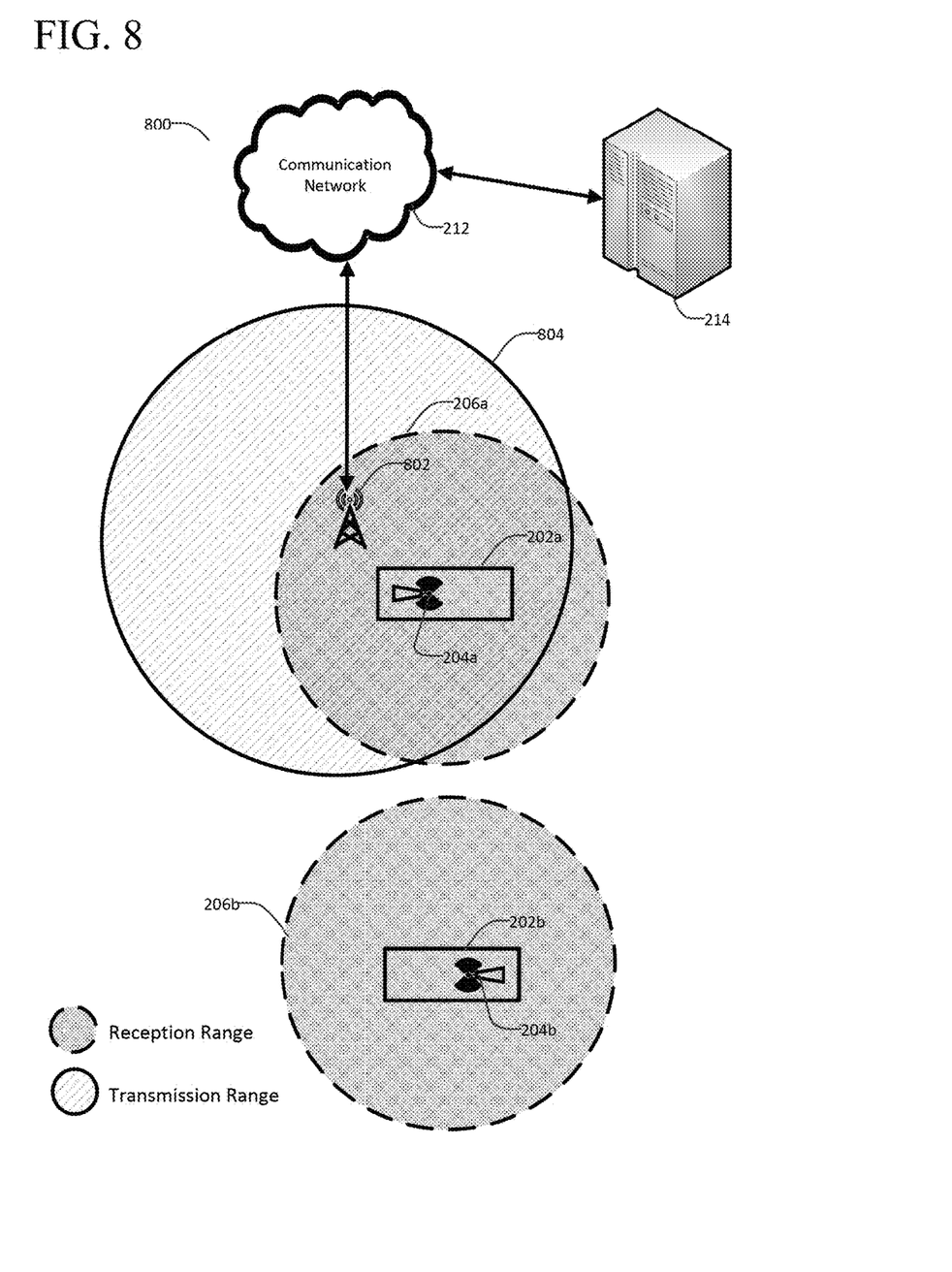
FIG. 8 shows a high level architecture of a system for a tag based asset management system without a predefined site in accordance to an embodiment of the invention.

FIG. 8 shows a high level architecture of system 800 for a tag based asset management system without a predefined site in accordance to an embodiment of the invention.

Gateway 802 may be similar to gateway 208, but it may be located in an area where there is no pre-defined site 106. For example, in a transit application, gateway 802 may be placed at a transit stop. Gateway 802 may be able to communicate with central management system 214 via communication network 212. Although gateway 802 may be used, system 800 (being offsite) may not require RFID communication so gateway 802 may not be present. In some applications when asset 202 is not at a site then GPS may be used (and GPS may be integrated into asset tag 204 or asset 202) as the deficiencies with GPS are not always crucial. For example, GPS is typically more power intensive, less accurate then some circumstances required herein (such as when onsite), and relies on being in reception with GPS satellites, which is sometimes not possible. GPS receivers also do not send their location, they only receive it, thus making further technology required to communicate as may be required herein (in particularly when onsite).

Reducing the power consumed by asset tag 204 may be a greater concern when asset 202 is away from site 106, as it may be a large amount of time before battery 308 on asset tag 204 can be replaced or charged if it runs out of power. If battery 308 runs out of power, it could also lead to inaccurate data, or no data at all, being collected on the status of asset 202. In response to these concerns, the onsite communications performed by gateway 802 may be different than the onsite communications performed by gateway 208. For example, gateway 802 may only request asset tag 204 to identify itself, and then relay this information to central management 214, which may use this identification to track the location of asset 202. Once communications between gateway 802 and asset tag 204 are complete, gateway 802 may also send a signal to asset tag 204 to enter a 'sleep' state to further conserve power.

Asset tag 204 may also behave differently when it is offsite. For example, transceiver 304 may be configured to listen for chatter less frequently (such as by increasing the length of transition 726), and for shorter periods of time (such as by shortening the length of listen for chatter 728), and remain in sleep mode for longer periods of time (such as by configuring a timer on clock 310 to last for a longer period of time before waking up asset tag 204), when asset 202 is offsite. Asset tag 204 may also communicate with sensors and other components of asset 202 less frequently when offsite.

Gateway transmission range 804 may be the distance within which gateway 802 can transmit signals, which may be similar to gateway transmission range 210. The size of gateway transmission range 804 may be controlled by gateway 802 or central management system 214.

In locations without a pre-defined site 106, it may be important for gateway 802 to ensure that it is only communicating with asset tags 204 that are of interest to it. For example, in FIG. 8, asset 202*a* is an asset that gateway 804 wants to communicate with, but asset 202*b* is not. To ensure that gateway 802 only communicates with asset 202*a*, it may limit the size of gateway transmission range 804 to only allow asset 202a to be within communicable range. In an transit embodiment, gateway 802 may be placed beside a bi-directional roadway and only want assets 202 that are on the same side of the roadway to be in communicable range, and so it may reduce the size of gateway transmission range 804 to only cover that one half of the roadway. Once within communicable range of asset 202a, it may enter into onsite communications with asset 202a.

Asset tag 204 may also adjust the size of asset tag reception range 206 when it is located offsite to ensure that it only communicates with gateways 802 that it is meant to. For example, asset tag 204b, after completing its previous communications with a gateway 802 or 208, may have reduced the size of asset tag reception range 206b to only communicate with gateways 802 that it may be required to communicate with. This reduced size may have been transmitted to asset tag 204 during its communications with the previous gateway 802 or 208, the previous gateway 802 or 208 either having the required reduced size stored on board or sent to it by central management system 214. By optimally reducing the size of the asset tag reception range 206 as required when offsite, asset tag 204 may be able to further conserve battery power.

In one embodiment, asset tag 204 may be located on asset 202 that may be a taxi car. The taxi may sometimes be used for day shifts, and sometimes for night shifts, such that it would be difficult to determine based solely on time whether the taxi is in service or not. When the taxi is in service, it may collect data that could be used for later analysis by a central management system 214, and only send that data to gateway 208 via asset tag 204 when it returns to the taxi bay. Method 300 can be used to overcome the difficulties associated with determining if the taxi is in service by designating the taxi bay as a site, placing one or gateways 208 there and deeming a taxi in service when it is offsite ie. out of range taxi bay gateway 208, thus triggering data collection to begin.

In another embodiment, asset tag 204 may be located on asset 202 that may be a bus used to deliver transit services. The transit operations may be such that route timing data is collected from gateways 804 along the bus' route, stored onboard the bus, and is only sent when at a transit bay. In this embodiment, gateways 804 may have unique identifiers that tell asset tag 204 to begin onsite processes that consist of recording a time stamp for when the bus reached this particular gateway 804. When the bus returns to the transit bay, asset tag 204 may transmit this information to gateway 208 so that it may be compiled and analyzed by central management system 214.

In another embodiment, tag 204 may be located on asset 102 that may be sub-component that is to be delivered to an assembler and made part of an finished product. As such it may be desirable to use tag 104 to track the sub-component's location. For example, en route to the assembler tag 104 may not need to communicate and is thus silent while in motion. However, upon arrival at the assembler, the assembler's system (such as system 100) may need to communicate with tag 104 and hence it may be powered on when not in motion.

In a further example the invention may be practiced with fleets of vehicles (rental, emergency vehicles, etc), where different behavior may be desired when being delivered to the purchaser, driven in operation, or parked/stored at a site.

Generally embodiments of the present invention may be useful where an RFID tag, such as tag 104, is to be used to track assets, and those assets may be in motion (and are likely to operate differently when they are in motion).

What is claimed is:

1. A system for radio frequency identification (RFID) tag-based asset tracking comprising:
    one or more gateways, configured to create chatter in one or more gateway transmission ranges, wherein chatter comprises RFID communications, produced by chatter creating tags and chatter creating gateways, directed at a particular gateway or tag while still being heard, and acted upon, by gateways and tags that the chatter is not directed at;
    a tag, located on an asset and operable in a plurality of states, configured to
        identify the presence of chatter in a tag reception range; and
        if chatter is identified by the tag, created by a chatter creating gateway that is one of the one or more gateways, then:
            the tag enters a chatter present state.

2. The system of claim 1, wherein the one or more gateways are located at a site and the chatter present state comprises the tag performing onsite processes, further comprising:
    the tag sending the asset's status information to the chatter creating gateway; and
    the chatter creating gateway providing the asset's status information to a central management system.

3. The system of claim 1, wherein the identifying comprises:
    receiving one or more RFID communications;
    comparing each of the RFID communications to a list of chatter.

4. The system of claim 3 wherein the RFID communications comprise one or more packets each having a packet header and wherein the list of chatter comprises a list of packet headers that are chatter.

5. The system of claim 1, wherein the gateway transmission range of each of the one or more gateways and the tag reception range can be controlled.

6. The system of claim 5, wherein the location of the one or more gateways and the size of the gateway transmission ranges are configured to minimize the size and number of gap spaces at a site.

7. The system of claim 5, wherein the one or more gateways are located offsite and the chatter present state comprises the tag performing offsite processes, further comprising:
    the chatter creating gateway requesting a status information of the tag;
    the tag sending a message with its status information to the chatter creating gateway.

8. A method for a tag in an asset management system, able to operate in a plurality of states, comprising:
    listening for chatter, produced by one or more gateways that can produce chatter, within a tag reception range, wherein chatter comprises RFID communications, produced by chatter creating tags and chatter creating gateways, directed at a particular gateway or tag while still being heard, and acted upon, by gateways and tags that the chatter is not directed at;
    if chatter is heard:
        checking the chatter to determine if it is chatter for the tag;
        if the chatter is chatter for the tag:
            transmitting an acknowledgment signal to the chatter producing gateway; and
            entering a chatter present state; and if the chatter is not chatter for the tag:
   entering a sleep state.

9. A system for radio frequency identification (RFID) tag-based asset tracking comprising:
   one or more gateways, configured to create chatter in one or more gateway transmission ranges, wherein chatter comprises RFID communications, produced by chatter creating tags and chatter creating gateways, directed at a particular gateway or tag while still being heard, and acted upon, by gateways and tags that the chatter is not directed at;
   one or more chatter creating tags, configured to create chatter in one or more tag transmission ranges;
   a tag, located on an asset and operable in a plurality of states, including a sleep state, and a listen state, configured to:
      identify the presence of chatter, from one of the one or more gateways or chatter creating tags, in a tag reception range while in the listen state; and
      if chatter is identified by the tag:
         receive an identifier, based on the identified chatter, and compare the identifier to a list of stored identifiers in a memory on the tag; and
         if the identifier is matched then the tag sends the asset's status information; and
         if the identifier is not matched then the tag returns to the sleep state.

10. A system for radio frequency identification (RFID) tag-based asset tracking comprising:
   one or more gateways, configured to create chatter in one or more gateway transmission ranges;
   one or more chatter creating tags, configured to create chatter in one or more tag transmission ranges;
   a tag, located on an asset and operable in a plurality of states, including a sleep state, and a listen state, configured to:
      identify the presence of chatter, from one of the one or more gateways or chatter creating tags, in a tag reception range while in the listen state; and
      if chatter is identified by the tag:
         receive an identifier, based on the identified chatter, and compare the identifier to a list of stored identifiers in a memory on the tag, wherein the list of stored identifiers comprises a subset of the one or more gateways that tag may communicate with; and
         if the identifier is matched then the tag sends the asset's status information; and
         if the identifier is not matched then the tag returns to the sleep state.

11. The system of claim 10 wherein the gateway transmission range of each of the one or more gateways and the tag reception range can be controlled.

12. The system of claim 10 where the tag controls the tag reception range while the tag is at a site, to maintain an optimal tag reception range at the site based on a largest gap space at the site.

13. The system of claim 10 where the tag reduces the tag reception range when the tag is not at the site.

14. A system for radio frequency identification (RFID) tag-based asset tracking comprising:
   one or more chatter creating tags, configured to create chatter in one or more tag transmission ranges, wherein chatter comprises RFID communications, produced by chatter creating tags and chatter creating gateways, directed at a particular gateway or tag while still being heard, and acted upon, by gateways and tags that the chatter is not directed at;
   a tag, located on an asset and operable in a plurality of states, configured to
      identify the presence of chatter in a tag reception range; and
      if chatter is identified by the tag, created by one of the one or more chatter creating tags, then:
         the tag enters a chatter present state.

* * * * *